(12) United States Patent
Cox (10) Patent No.: US 11,532,309 B2
(45) Date of Patent: Dec. 20, 2022

(54) TECHNIQUES FOR CONVERTING NATURAL SPEECH TO PROGRAMMING CODE

(71) Applicant: Austin Cox, Seattle, WA (US)

(72) Inventor: Austin Cox, Seattle, WA (US)

(73) Assignee: Austin Cox, Seattle, WA (US)

( * ) Notice: Subject to any disclaimer, the term of this patent is extended or adjusted under 35 U.S.C. 154(b) by 0 days.

(21) Appl. No.: 17/246,220

(22) Filed: Apr. 30, 2021

(65) Prior Publication Data

US 2021/0343292 A1 Nov. 4, 2021

Related U.S. Application Data

(60) Provisional application No. 63/019,629, filed on May 4, 2020.

(51) Int. Cl.
*G10L 15/26* (2006.01)
*G10L 15/22* (2006.01)
*G06F 8/30* (2018.01)

(52) U.S. Cl.
CPC ............... *G10L 15/26* (2013.01); *G06F 8/31* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 6,023,578 | A * | 2/2000 | Birsan | G06F 8/10 717/108 |
| 6,026,233 | A * | 2/2000 | Shulman | G06F 8/33 715/708 |
| 7,203,933 | B2 * | 4/2007 | Souloglou | G06F 8/44 717/148 |
| 8,230,394 | B2 * | 7/2012 | Clemenceau | G06F 9/44505 717/124 |
| 8,561,014 | B2 * | 10/2013 | Mengusoglu | G06F 40/205 717/136 |
| 9,886,248 | B2 * | 2/2018 | Doddavula | G06F 8/36 |
| 10,776,082 | B2 * | 9/2020 | Dey | G06F 40/30 |

(Continued)

OTHER PUBLICATIONS

Application No. PCT/US2021/030274, International Search Report and the Written Opinion, Mailed On Aug. 6, 2021,7 pages.

(Continued)

*Primary Examiner* — Neeraj Sharma
(74) *Attorney, Agent, or Firm* — Kilpatrick Townsend & Stockton LLP (57) ABSTRACT

Described herein are a system and techniques for generating programming code from unstructured text (e.g., natural speech). To do this, upon receiving a request for programming code, the system parses unstructured text using natural language processing to identify an entity. The system then identifies a template associated with that entity. The template may also be associated with a particular programming language. Once a template has been selected, a number of parameters associated with the template are identified. The parameters are then matched to data values included in the unstructured text. Once data values have been identified for each of the parameters, the requested programming code is generated using the template and data values.

19 Claims, 6 Drawing Sheets

(56) References Cited

U.S. PATENT DOCUMENTS

| | | | |
|---|---|---|---|
| 10,977,015 B1* | 4/2021 | Harijan | G06F 16/156 |
| 2003/0149969 A1* | 8/2003 | Ogasawara | G06F 8/4435 |
| | | | 717/158 |
| 2003/0163323 A1 | 8/2003 | Bluvband | |
| 2006/0123220 A1 | 6/2006 | Colson | |
| 2010/0241418 A1* | 9/2010 | Maeda | G10L 15/1815 |
| | | | 704/E15.001 |
| 2015/0279366 A1 | 10/2015 | Krestnikov et al. | |
| 2016/0110379 A1* | 4/2016 | Arens | G06F 16/13 |
| | | | 707/829 |
| 2016/0134568 A1* | 5/2016 | Woo | H04L 51/046 |
| | | | 709/206 |
| 2016/0148610 A1 | 5/2016 | Kennewick, Jr. et al. | |
| 2017/0102925 A1* | 4/2017 | Ali | G06F 8/30 |
| 2017/0239576 A1* | 8/2017 | Hsiao | G06F 40/55 |
| 2018/0032055 A1* | 2/2018 | Janssen | G06F 8/436 |
| 2020/0320130 A1* | 10/2020 | Korpman | G06F 16/8373 |

OTHER PUBLICATIONS

ROSENBLATT, "VocalIDE: An IDE for Programming Via Speech Recognition", ASSETS'17, Available Online At; https://dl.acm.org/doi/pdf/10.1145/3132525.3134824, Nov. 2017, pp. 417-418.
Sridhar et al., "A Compiler-based Approach for Natural Language to Code Conversion", 3rd International Conference on Computer and Informatics Engineering (IC21E), Available Online at https://ieeexplore.IEEE.org/document/9274674, Sep. 16, 2020, pp. 1-6.

* cited by examiner

TECHNIQUES FOR CONVERTING NATURAL SPEECH TO PROGRAMMING CODE

CROSS-REFERENCE TO RELATED APPLICATIONS

This application claims the benefit of U.S. Provisional Application No. 63/019,629, filed May 4, 2020, the entire contents of which are hereby incorporated in their entirety for all purposes.

BACKGROUND

Software development, and in particular writing programming code, is often a tedious process that requires the developer to write out a number of redundancies. The tedious nature of the work can lead to the introduction of errors and inconsistencies.

Embodiments of the invention address these and other problems, individually and collectively.

BRIEF SUMMARY

The present disclosure relates to system and techniques for generating programming code from unstructured data (e.g., natural speech). To do this, upon receiving a request for programming code, the system parses unstructured data such as text or a voice stream using natural language processing to identify an entity (e.g., a programming entity such as a module). The system then identifies a template associated with that entity. The template may also be associated with a particular programming language. Once a template has been selected, a number of parameters associated with the template are identified. The parameters are then matched to data values (e.g., values, variables, functions names, etc.) included in the unstructured text. Once data values have been identified for each of the parameters, the requested programming code is generated using the template and data values.

One embodiment of the disclosure is directed to a method comprising receiving a request for programming code from a user (the request including unstructured text data), identifying an intended entity from the unstructured text, identifying a template associated with the intended entity from a set of templates (the template including a set of parameters), determining, from the unstructured text data, values for each of the parameters in the set of parameters, and generating the programming code by populating each of the parameters in the set of parameters of the template with its determined value.

Another embodiment of the disclosure is directed to computing system comprising: a processor; and a memory including instructions that, when executed with the processor, cause the computing system to, at least: receive a request for programming code from a user, the request including unstructured text data, identify, from the unstructured text, an intended entity, identify, from a set of templates, a template associated with the intended entity, the template including a set of parameters, determine, from the unstructured text data, values for each of the parameters in the set of parameters, and generate the programming code by populating each of the parameters in the set of parameters of the template with its determined value.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Described herein are a system and techniques configured to generate programming code from unstructured text data. Data may be provided to the system in either audio or text form. Audio data provided to the system is translated into text using speech to text techniques. Additionally, the system identifies a programming language for which programming code is to be generated. Language processing techniques are used to identify an intended entity from the text data. These techniques may account for context, such as a current state of a project for which the system is being implemented. The state of a project may include a library of variable names which have been defined in the project, a list of function/method names defined in the project, formatting preferences for the project (i.e., spacing, indentation, etc.) and any other suitable project-specific data. Once an intended entity has been identified, a template associated with that identified entity and the identified programming language is determined. The system then identifies parameters associated with the determined template. The text data is then parsed to identify values for the identified parameters, which are then populated into the template to generate programming code.

Figure 1:
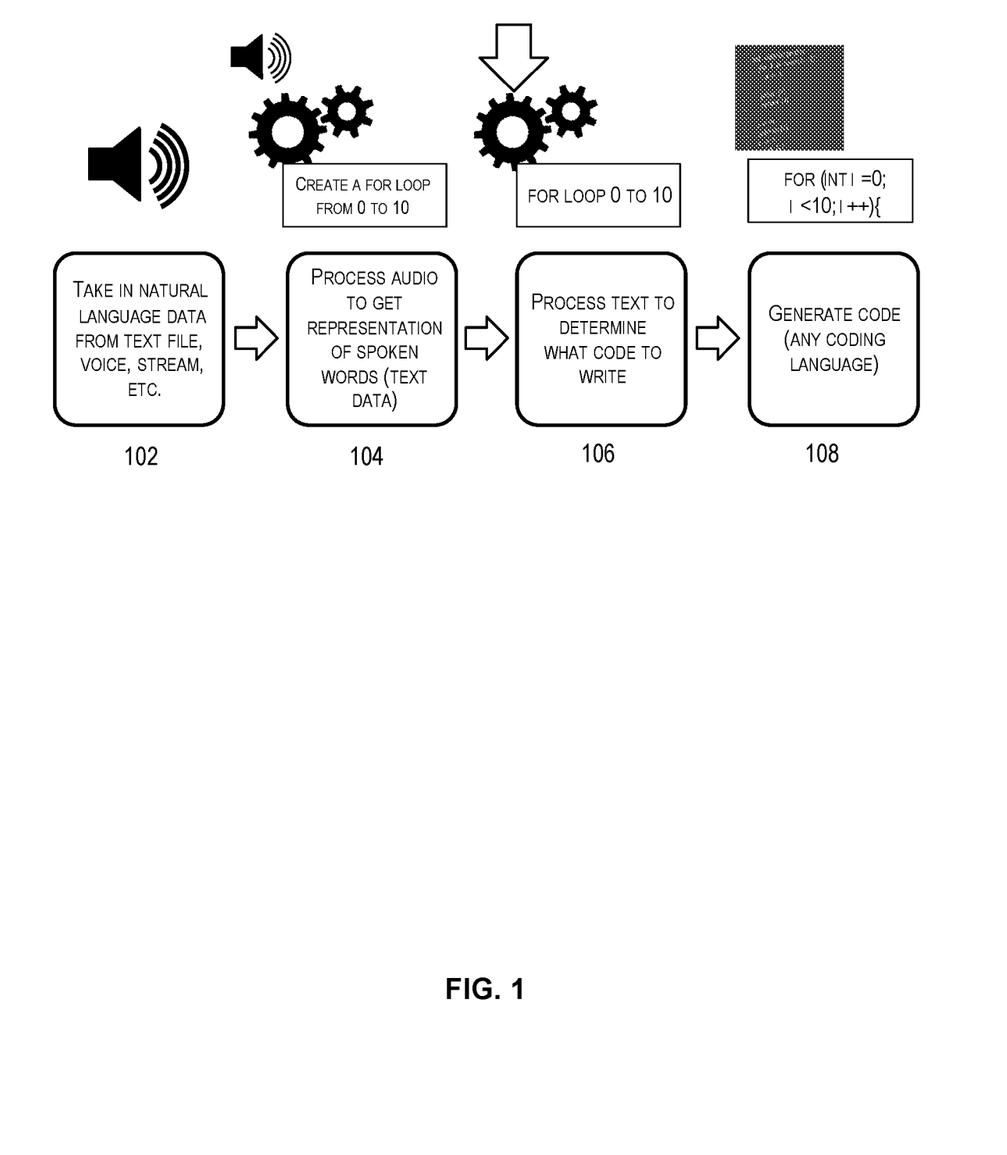
FIG. 1 depicts a process flow illustrating an example embodiment of techniques for generating programming code from unstructured text as described herein.

FIG. 1 depicts a process flow illustrating an example embodiment of techniques for generating programming code from unstructured text as described herein. In the process 100 as depicted in FIG. 1, the system may take in data at 102. For example, the system may receive data in the form of audio instructions. The data may be formatted as unstructured text, such as natural speech. It should be noted that the received text data may be in any suitable language.

Upon receiving the data, the system may process that data to convert that data into text data at 104. To do this, the system may utilize one or more audio to text conversion techniques. The converted text data may then be processed to identify an intended entity of the received data at 106. To do this, the system may utilize a number of natural language processing techniques to determine a closest match in known entities. The system then identifies a template for the closest matching entity.

Once the system has identified a template, the system generates programmatic code by populating the template with values at 108. In some embodiments, values may be obtained from the natural language. In these embodiments, the particular values to be populated into the template may be identified using language processing. Alternatively, some values for populating the template may be obtained from a project state. For example one may define and set a variable x to a value of 10 for a particular project. In this example, the system, upon determining that a for loop is to be created "from 1 to x", would then populate "x" with the value of 10 stored in the project state data, resulting in a for loop being created "from 1 to 10."

Figure 2:
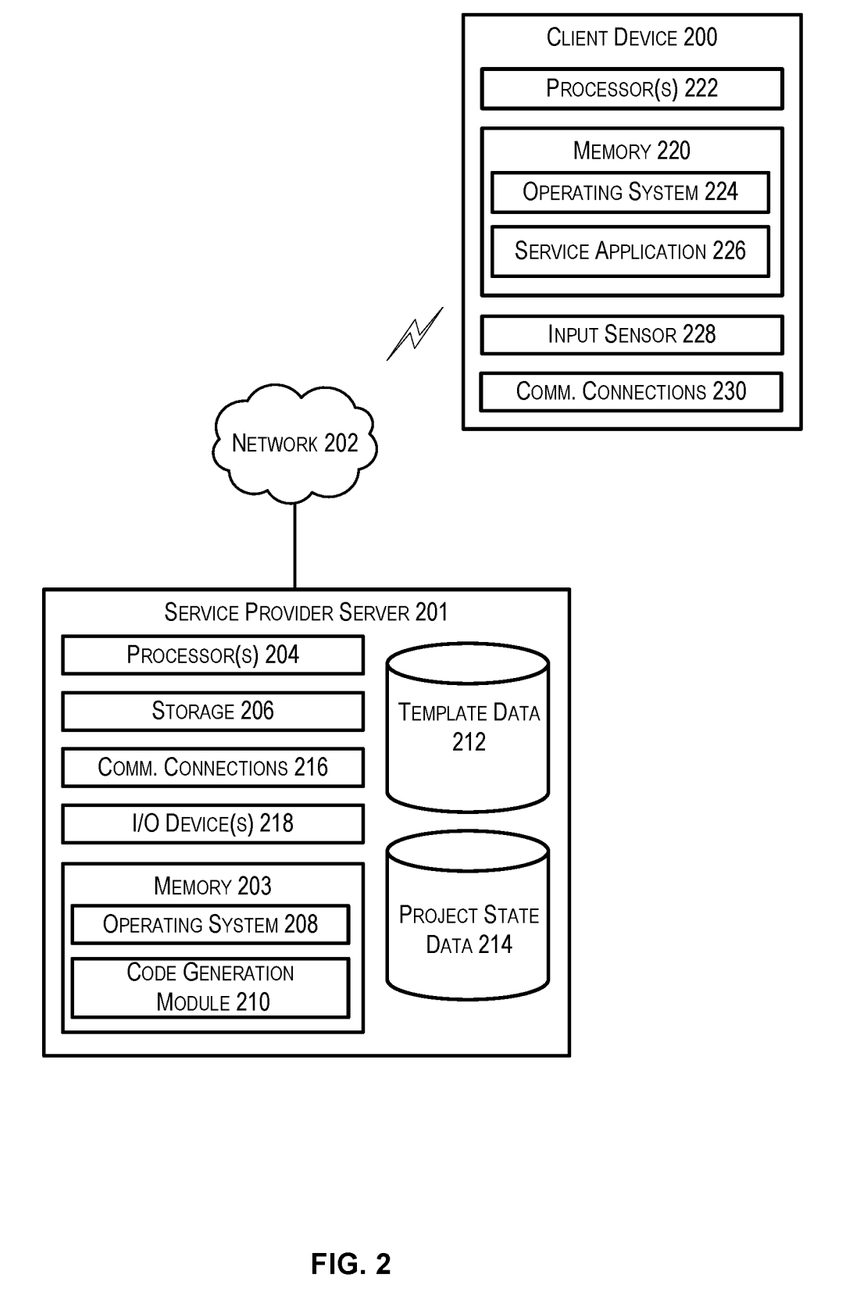
FIG. 2 depicts an example system architecture for a system that may be implemented to perform the functionality described in accordance with at least some embodiments.

FIG. 2 depicts an example system architecture for a system that may be implemented to perform the functionality described in accordance with at least some embodiments. As depicted in FIG. 2, an exemplary architecture may include a client device 200 and a service provider server 201. In some embodiments, the service provider server 201 may be remote from the client device 200. The client device 200 and service provider server 201 may communicate either directly or over a communication network 202.

The service provider server 201 may be any type of computing device configured to perform at least a portion of the functionality described herein. In some embodiments, the service provider server 201 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider server 201 may include a memory 203 and one or more processing units (or processor(s) 204). The processor(s) 204 may be implemented as appropriate in hardware, computer-executable instructions, firmware or combinations thereof. Computer-executable instruction or firmware implementations of the processor(s) 204 may include computer-executable or machine executable instructions written in any suitable programming language to perform the various functions described.

The memory 203 may store program instructions that are loadable and executable on the processor(s) 204, as well as data generated during the execution of these programs. Depending on the configuration and type of service provider server 201, the memory 203 may be volatile (such as random access memory (RAM)) and/or non-volatile (such as read-only memory (ROM), flash memory, etc.). The service provider server 201 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 203 may include multiple different types of memory, such as static random access memory (SRAM), dynamic random access memory (DRAM) or ROM. Turning to the contents of the memory 203 in more detail, the memory 203 may include an operating system 208 and one or more application programs or services for implementing the features disclosed herein including at least a module for generating programming code from received text data (e.g., via code generation module 210). The memory 203 may also include template data 212, which maintains templates for each entity/intent and for each programming language, as well as project state data 214, which provides information related to users (e.g., general preferences, etc.) and project states which may be used to provide context. For example, in some embodiments, the template data 212 and/or project state data 214 may be stored in a database.

The memory 203 and the additional storage 206, both removable and non-removable, are examples of computer-readable storage media. Computer-readable storage media may be implemented using any method or technology for storage of information such as computer-readable instructions, data structures, program modules or other data. As used herein, modules may refer to programming modules executed by computing systems (e.g., processors) that are installed on and/or executed from the service provider server 201. The service provider server 201 may also contain communications connection(s) 216 that allow the service provider server 201 to communicate with a stored database, another computing device or server, user terminals, and/or other components of the described system. The service provider server 201 may also include input/output (I/O) device(s) and/or ports 218, such as for enabling connection with a keyboard, a mouse, a pen, a voice input device, a touch input device, a display, speakers, a printer, etc.

In some embodiments, the code generation module 210 may be configured to, in conjunction with the processor(s) 204, receive text data from a user. The code generation module 210 then processes the received text data using natural language processing to identify an intended programming entity of the text data. The code generation module 210 then identifies one or more templates for the intended programming entity from the template data 212. For example, the template data 212 may maintain a number of templates associated with each programming entity, each of which is associated with a different programming language. In this example, the code generation module 210 may identify an appropriate programming language and one of the number of templates associated with the determined programming language. Once a template has been identified, a number of data fields may be determined from the template. The code generation module 210 then identifies values for each of the number of data fields from the received text data or the active project state. To do this, the code generation module 210 may identify potential data values for the data fields based on those data values being of a particular type associated with the data field. The code generation module 210 then determines the most likely data value from the potential data values. The code generation module 210 then generates programming code by populating the data fields for the identified template with the respective data values.

The client device 200 may comprise any portable electronic device capable of performing the functions disclosed herein as being attributed to the client device 200. The client device 200 may include a memory 220 (e.g., a computer-readable storage medium) storing instructions that, when executed by a processor 222 of the client device 200, enable the user device to perform its intended functions. Turning to the contents of the memory 220 in more detail, the memory 220 may include an operating system 224 that provides executable program instructions for the general administration and operation of the client device 200, and at least a service application 226 configured to cause the client device 200 to communicate with the service provider server 201 in order to receive and utilize device keys. Additionally, the client device 200 may include one or more input sensors 228 capable of receiving input provided by a user (e.g., a keyboard and/or microphone) and a number of communication connections 230 which enable the client device 200 to communicate with other electronic devices. The communication connections 230 may include wireless or direct physical connections. Additionally, wireless connections may include any combination of short-range or long range wireless protocols.

The service application 226 may be configured to, in conjunction with a processor 222, cause the client device 200 to receive input from a user (e.g., audio or text input) and provide that input to the service provider server 201. In some embodiments, the service application 226 may be configured to convert received audio data into text data using a speech to text application. In some embodiments, the service application 226 may enable the user to select a programming language in which the programming code is to be generated. For example, the user may be provided (via a GUI of the service application) with a drop-down menu from which the user is able to select a current programming language. Upon receiving and conveying a request for programming code to the service provider server 201, the service application 226 may be further configured to receive the generated programming code from the code generation module 210 in response and to present that programming code to the requestor. In some embodiments, the user may be provided the ability to copy the programming code to another application. In some embodiments, the programming code may be provided directly to a second application. In some embodiments, the service application 226 may include a widget or an extension to another software application. For example, the service application 226 may extend the functionality of a software development kit (SDK).

In some embodiments, the communication network 202 may include any one or a combination of many different types of networks, such as cable networks, the Internet, wireless networks, cellular networks, and other private and/or public networks. In addition, the communication network 202 may comprise multiple different networks. For example, the client device 200 may utilize a 3G network to communicate with a wireless router, which may then route the communication over a public network (e.g., the Internet) to the service provider server 201.

Figure 3:
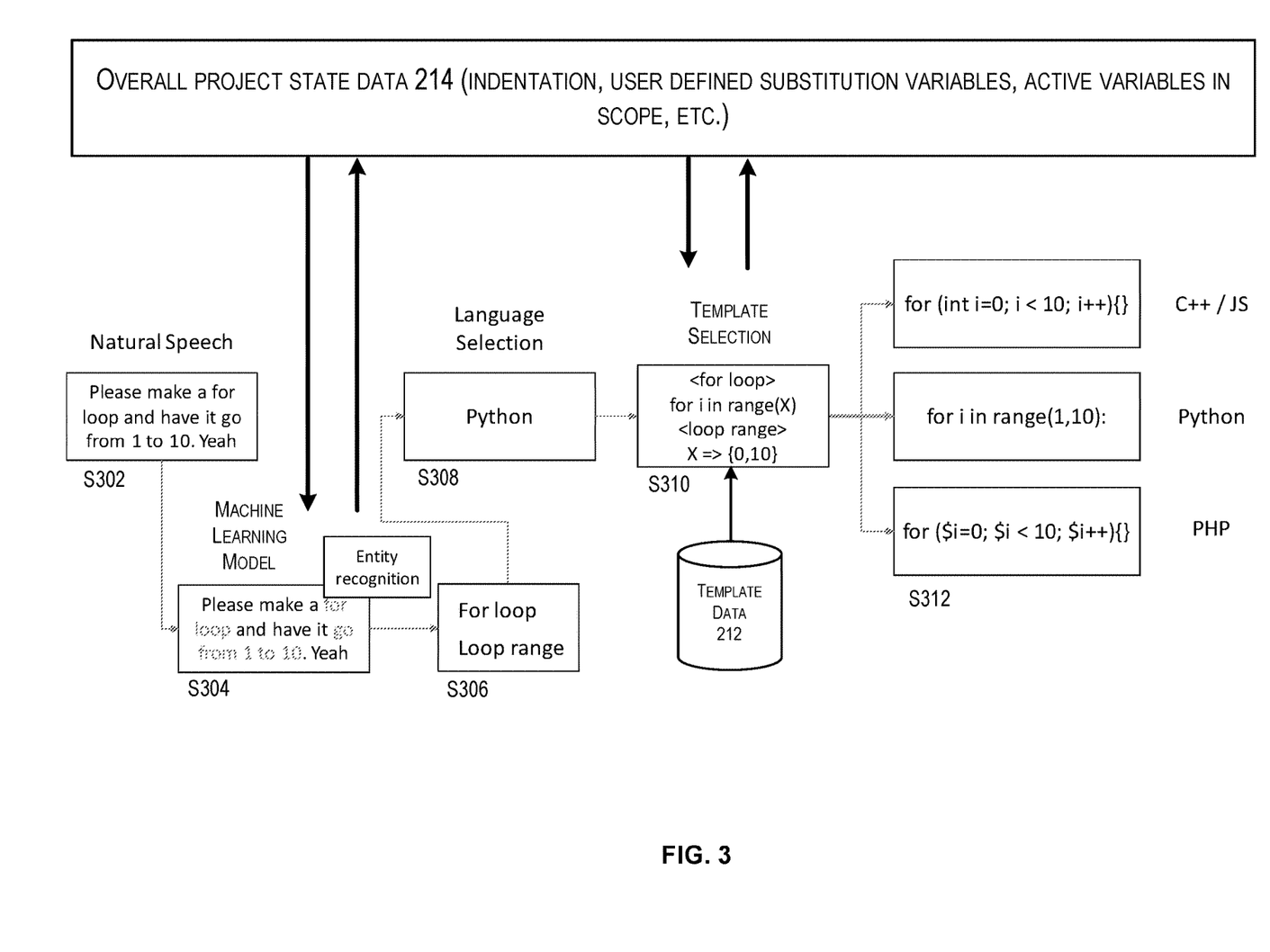
FIG. 3 depicts a process for generating programming code from natural speech in accordance with at least some embodiments.

FIG. 3 depicts a process for generating programming code from natural speech in accordance with at least some embodiments. Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the service provider server 201 shown in FIG. 2. The code may be stored on a computer-readable storage medium, for example, in the form of a computer program including a plurality of instructions executable by one or more processors. The computer-readable storage medium may be non-transitory.

Process 300 may begin at S302, when natural speech is received by the service provider server 201. The natural speech may be received in any language and may include instructions to generate a piece of programming code. Additionally, the natural language may be received in text format or the natural language may be received in audio format and converted into text format.

At S304, the service provider processes the received text data by performing entity recognition. To do this, the service provider may subject the natural speech to a trained machine learning model (e.g., a deep learning model). Such a model may be trained using a set of words and/or phrases provided in association with each entity. For example, the system may receive, for each programming entity associated with a template, a respective set of words indicating an intent to select that programming entity.

It should be noted that the system may be customized for a particular user. For example, a user may create his/her own template to be used by the system. In this example, the template and a set of words/phrases to be associated with that template are provided by the user to the service provider. Once the template and set of words/phrases has been received, a machine learning model may be trained on the provided words/phrases.

At S306, the service provider determines an intended entity for the request. In some embodiments, this may involve providing the natural speech to a trained machine learning model in order to obtain an output of a potential entity or potential entities. In some cases, the model may output multiple potential entities, each of which are associated with a percentage likelihood of being the intended entity.

In some embodiments, upon receiving a request to generate programming code from a user, a context in which the request was received may be used to identify an appropriate programming entity. For example, the system may be context aware, in that it maintains project state data 214 specific to a user and/or project for which the request is received. In this example, output results returned by the machine learning model may be weighted based on that context data such that the project state data 214 may be used in selecting an appropriate programming entity (e.g., based on historical entity selection). In some embodiments, project state data 214 may be used and/or updated at step 306. For example, if the natural speech includes a command to "call function x," the system may identify a "function x" as an intended entity within the project state data 214.

At S308, the service provider may optionally determine a programming language to be associated with the request. In some embodiments, the programming language may be selected by the user (e.g., via a drop-down or other selector). In some embodiments, the programming language may be selected based on project state data 214. For example, the programming language may be selected based on past requests by the same user (and on the same project) resulting in programming code being generated in a particular language. Note that step S308 may be optional in that, in some embodiments, the service provider may not select any language at this step.

At S310, the service provider may select one or more templates based on the entity determined at S306. For example, multiple templates may be selected from the template data 212, wherein each selected template is associated with the determined programming entity but a different programming language. In some embodiments, a single template may also be selected based on its association with the entity determined at step S306 as well as a programming language selected at step S308. In some embodiments, project state data 214 may be used and/or updated at step 310. For example, if the natural speech includes "call function x," the system may identify a function x within the project state data 214 to be implemented (e.g., at 306). In this example, function x will likely have arguments to input. These arguments may be populated with data from the natural speech, variables previously defined in the project state data 214, or some combination of the two. In a second example, if the natural speech includes "set x to 10," the system may store an indication that x=10 in the project state data 214. In this way, the system is able to determine, based on the project state data 214, that x is in scope and that its value is 10. This information may be used to fill in data of another template downstream or for the project to perform formatting or cleanup operations.

At S312, the service provider generates programming code using the template(s) selected at step S310. To do this, the system may identify a number of data fields within the template to be populated with data values from the natural speech. For example, a template for a "for loop" programming entity may include at least two data fields associated with a range of the for loop. In this example, the system may populate the two data fields with integers found in the natural speech. If the natural language is "Please make a for loop and have it go from 1 to 10," then the system may identify potential data values of 1 and 10. The system may then populate the data field associated with the lower bound of the range with a 1 and the data field associated with the higher bound of the range with a 10 (since the lower bound would typically involve a lower number or alternatively because it came first in the text). Additionally, some values used to populate data fields in the template may be drawn from the project state data 214. For example, if the natural language is "Please make a for loop and have it go from 1 to X," then the system may identify potential data values of 1 and X. The system may then determine that X is a variable which has been defined in the project state data. If X has been set to a particular value, then the system may populate that particular value into the for loop. However, if X has not been set to a particular value, then the variable X itself may be populated into the data field.

Once the data fields of the template have been populated with data values from the natural speech, the programming code is generated by being constructed in a manner indicated in the template. For example, the programming code may be a string of text which is generated by appending structured text and data values included in the template in a specified order. The programming code is then returned to the requestor in response to the request. In some embodiments, once a programming entity is determined, the programming code may be generated in multiple different programming languages and presented to the requestor. In these embodiments, the requestor may be enabled to select one of the generated programming codes. This enables the system to generate programming code independent of selection of a programming language. In some embodiments, a programming language may be recommended to the requestor.

Figure 4:
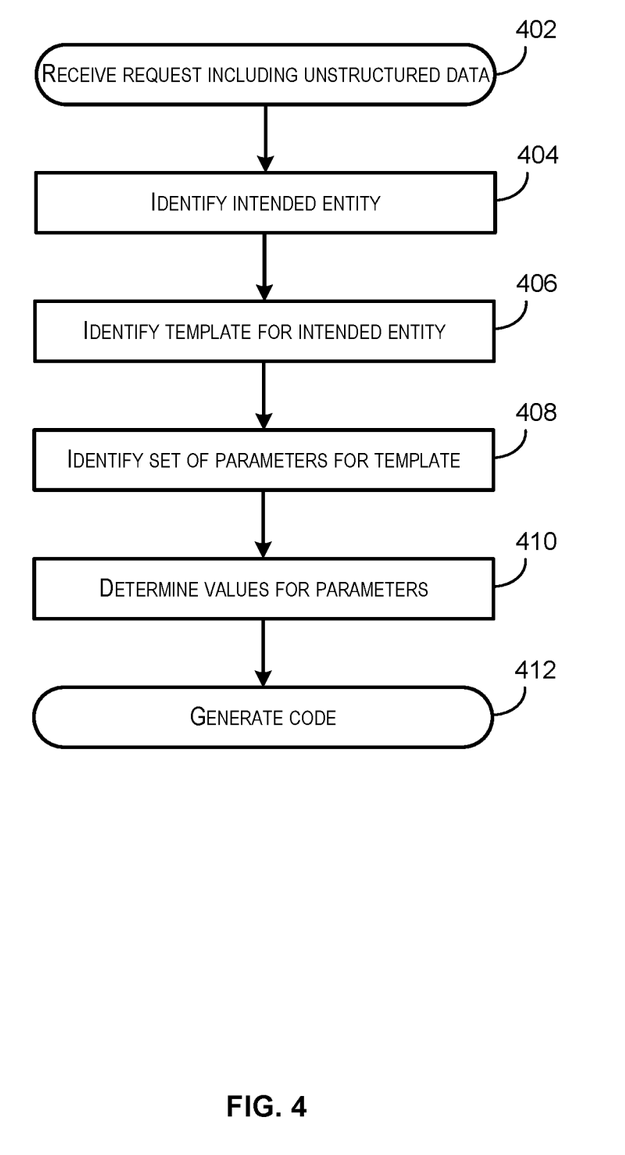
FIG. 4 depicts a flow diagram illustrating a process for generating programming code from unstructured text in accordance with at least some embodiments.

FIG. 4 depicts a flow diagram illustrating a process for generating programming code from unstructured text in accordance with at least some embodiments. In accordance with at least one embodiment, the process 400 of FIG. 4 may be performed by at least the service provider server 201 shown in FIG. 2.

Process 400 may begin at 402 when a request is received to generate programming code. The request may include unstructured data such as natural speech. In some embodiments, the request is received as text data. In some embodiments, the request is an audio request and the process 400 further involves converting the audio request into a text-based request. This may be done using one or more speech to text techniques. In some embodiments, the request may also include an indication of a programming language.

At 404, process 400 involves identifying an intended entity from the unstructured data. This may involve the use of one or more natural language processing techniques. An intended entity may include any programming entity, such as a module or method, determined to be the intended target of the received request. In some embodiments, a context in which the request has been provided (e.g., a currently-active project or other recent requests) may be used to determine the intended entity. For example, a project state may store information regarding functions used in the current project.

At 406, process 400 involves identifying a template from a number of templates. As noted elsewhere, the system may store a number of templates, with each template being associated with an entity. In some embodiments, users may define their own entities and may provide example text data to be used in identifying that entity (e.g., by training a ML model on the text data). Additionally, the system may be context-aware in that a higher weight may be given to entities frequently used by the particular user from which the request was received. In some embodiments, each template is further associated with the programming language. For example, the system may store a number of templates associated with each entity, wherein each of the number of templates is further associated with a particular programming language. In some embodiments, the template may be selected based on the determined entity as well as the programming language being used. The programming language being used may be indicated in the request or it may be set by a user of the system. For example, the user may select a programming language from a dropdown menu and all received requests will be automatically associated with that selected programming language.

At 408, process 400 involves identifying a set of parameters associated with the template. For example, the template may include some amount of structured text as well as a number of data fields, where each data field represents a type of value (integer, alphanumeric, etc.) to be populated into the template at the location of the data field.

At 410, process 400 involves determining values for each of the parameters in the set of parameters from the unstructured data. To do this, one or more natural language processing techniques may be used. In some embodiments, the system may identify a number of potential values for the identified parameters and then map each parameter to its best matching potential value. Additionally, a context in which the request has been provided (e.g., a project state for a currently-active project or other recent requests) may be used to determine values which relate to each of the identified data fields. For example, a project state may store information regarding implemented data values used in the project.

At 412, process 400 involves generating programming code. This may be done by populating the set of parameters in the template with their respective determined values. The programming code (e.g., the fully-populated template) is then returned in response to the received request.

Figure 5:
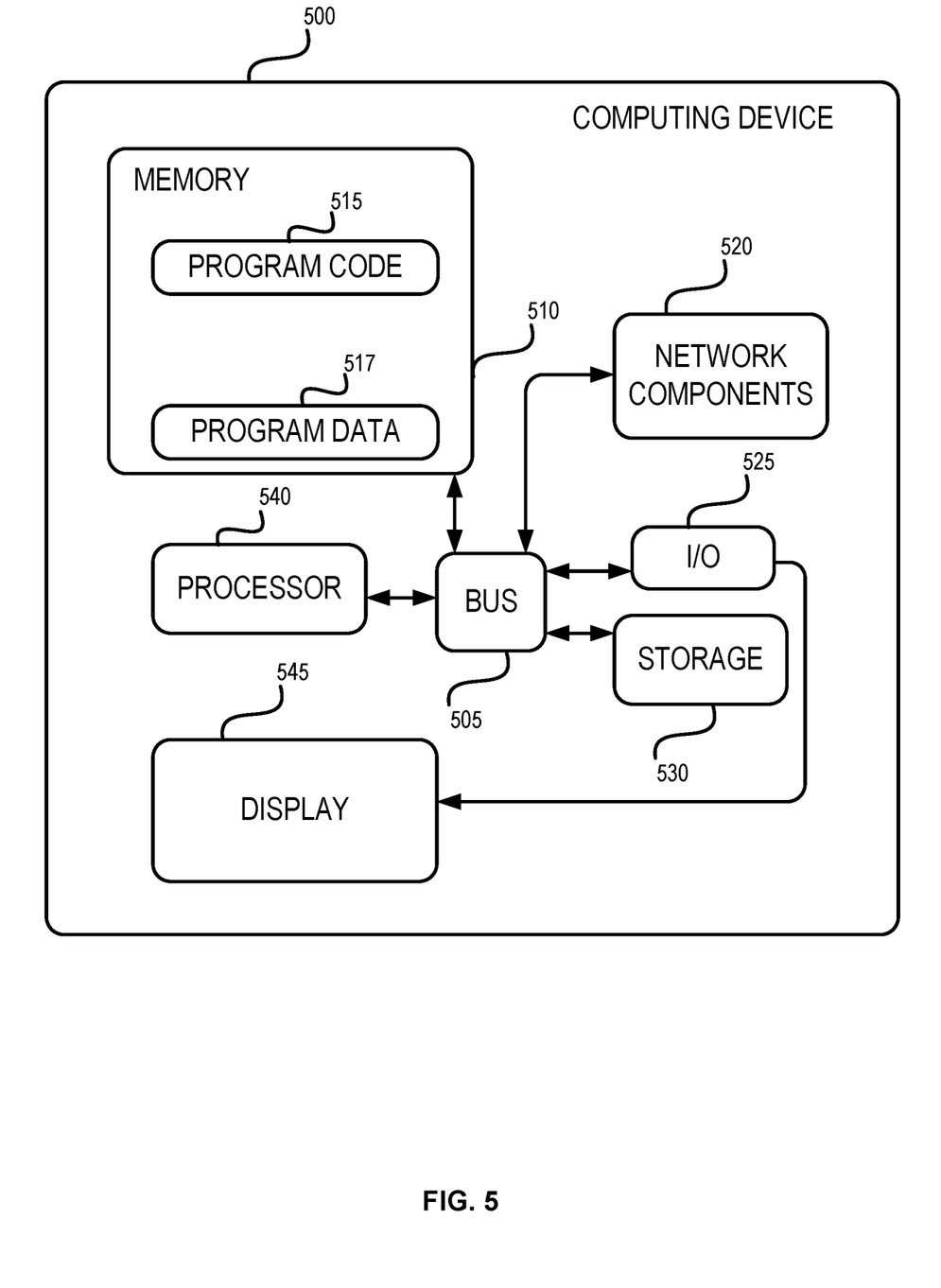
FIG. 5 illustrates a block diagram of a computing system, according to some embodiments.

FIG. 5 illustrates a block diagram of an example of a computing device 500. Computing device 500 can be any of the described computers herein including, for example, service provider server 201 and/or client device 200. The computing device 500 can be or include, for example, an integrated computer, a laptop computer, desktop computer, tablet, server, or other electronic device.

The computing device 500 can include a processor 540 interfaced with other hardware via a bus 505. A memory 510, which can include any suitable tangible (and non-transitory) computer readable medium, such as RAM, ROM, EEPROM, or the like, can embody program components (e.g., program code 515) that configure operation of the computing device 500. Memory 510 can store the program code 515, program data 517, or both. In some examples, the computing device 500 can include input/output ("I/O") interface components 525 (e.g., for interfacing with a display 545, keyboard, mouse, and the like) and additional storage 530.

The computing device 500 executes program code 515 that configures the processor 540 to perform one or more of the operations described herein. Examples of the program code 515 include, in various embodiments logic flowchart described with respect to FIG. 1 above. The program code 515 may be resident in the memory 510 or any suitable computer-readable medium and may be executed by the processor 540 or any other suitable processor.

The computing device 500 may generate or receive program data 517 by virtue of executing the program code 515. For example, sensor data, trip counter, authenticated messages, trip flags, and other data described herein are all examples of program data 517 that may be used by the computing device 500 during execution of the program code 515.

The computing device 500 can include network components 520. Network components 520 can represent one or more of any components that facilitate a network connection. In some examples, the network components 520 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 520 can be wired and can include interfaces such as Ethernet, USB, or IEEE 1394.

Although FIG. 5 depicts a computing device 500 with a processor 540, the system can include any number of computing devices 500 and any number of processor 540. For example, several computing devices 500 or multiple processor 540 can be distributed over a wired or wireless network (e.g., a Wide Area Network, Local Area Network, or the Internet). The multiple computing devices 500 or multiple processor 540 can perform any of the steps of the present disclosure individually or in coordination with one another.

Figure 6:
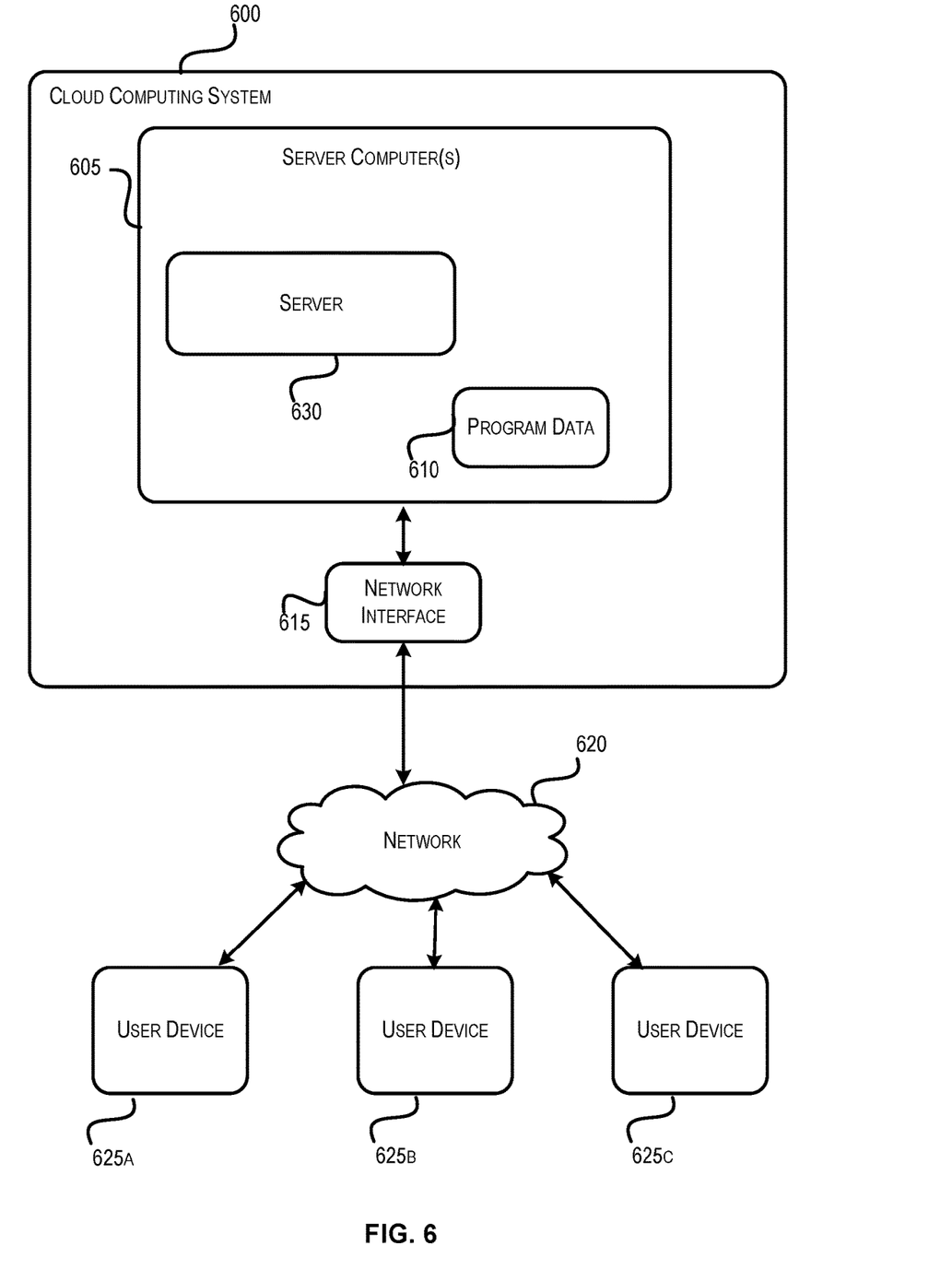
FIG. 6 illustrates a cloud computing system, according to some embodiments.

In some embodiments, the functionality provided by the computing device 500 may be offered as cloud services by a cloud service provider. For example, FIG. 6 depicts an example of a cloud computing system 600 offering an intelligence service that can be used by a number of user subscribers using user devices 625a, 625b, and 625c across a data network 620. User devices 625a, 625b, and 625c could be examples of a client device 200 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more server computers 605.

The server computers 605 include any suitable non-transitory computer-readable medium for storing program code (e.g., server 630) and program data 610, or both, which is used by the cloud computing system 600 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 605 can include volatile memory, non-volatile memory, or a combination thereof.

One or more of the server computers 605 execute the program data 610 that configures one or more processors of the server computers 605 to perform one or more of the operations that determine locations for interactive elements and operate the adaptive rule-based system. As depicted in the embodiment in FIG. 6, the one or more server computers 605 provide the services to perform the adaptive rule-based system via the server 630. Any other suitable systems or subsystems that perform one or more operations described herein (e.g., one or more development systems for configuring an interactive user interface) can also be implemented by the cloud computing system 600.

In certain embodiments, the cloud computing system 600 may implement the services by executing program code and/or using program data 610, which may be resident in a memory device of the server computers 605 or any suitable computer-readable medium and may be executed by the processors of the server computers 605 or any other suitable processor.

In some embodiments, the program data 610 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 620.

The cloud computing system 600 also includes a network interface device 615 that enable communications to and from cloud computing system 600. In certain embodiments, the network interface device 615 includes any device or group of devices suitable for establishing a wired or wireless data connection to the data networks 620. Non-limiting examples of the network interface device 615 include an Ethernet network adapter, a modem, and/or the like. The server 630 is able to communicate with the user devices 625a, 625b, and 625c via the data network 620 using the network interface device 615.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
   receiving a request for programming code from a user, the request including unstructured text data that identifies an intended entity, wherein the unstructured text data is input by the user;
   determining a context associated with the request using project state data that is specific to the user and a project for which the request for programming code is received;
   determining the intended entity from the unstructured text data and the determined context;
   identifying, from a set of templates, a template associated with the intended entity, the template including a set of parameters;
   extracting, from the unstructured text data, at least one value for at least one parameter in the set of parameters; and
   generating the programming code by populating each parameter in the set of parameters of the template with its determined value.

2. The method of claim 1, further comprising determining a programming language associated with the request, wherein the template is further associated with the programming language.

3. The method of claim 2, wherein the programming language is selected by the user.

4. The method of claim 1, wherein the intended entity is identified from the unstructured text data using one or more natural language processing techniques.

5. The method of claim 1, wherein receiving the request for programming code from the user comprises:
- receiving an audio request;
- converting the audio request into a text-based request; and
- deriving the unstructured text data from the text-based request.

6. The method of claim 5, wherein the audio request is converted into the text-based request using one or more speech to text techniques.

7. A computing system comprising:
- a processor; and
- a memory including instructions that, when executed with the processor, cause the computing system to, at least:
  - receive a request for programming code from a user, the request including unstructured text data that identifies an intended entity, wherein the unstructured text data is input by the user;
  - determine a context associated with the request using project state data that is specific to the user and a project for which the request for programming code is received;
  - determine the intended entity from the unstructured text data and the determined context;
  - identify, from a set of templates, a template associated with the intended entity, the template including a set of parameters;
  - extract, from the unstructured text data, at least one value for at least one parameter in the set of parameters; and
  - generate the programming code by populating each parameter in the set of parameters of the template with its determined value.

8. The computing system of claim 7, wherein the instructions comprise further instructions that, when executed with the processor, cause the computing system to determine a programming language associated with the request, wherein the template is further associated with the programming language.

9. The computing system of claim 8, wherein causing the computing system to determine the programming language comprises receiving an input by the user.

10. The computing system of claim 7, wherein the intended entity is identified from the unstructured text data using one or more natural language processing techniques.

11. The computing system of claim 7, wherein the instructions to receive the request for programming code from the user comprises receiving an audio request and converting the audio request into a text-based request.

12. The computing system of claim 11, wherein the audio request is converted into the text-based request using one or more speech to text techniques.

13. A non-transitory computer-readable medium having instructions stored thereon that, when executed by one or more processors, cause the one or more processors to:
- receive a request for programming code from a user, the request including unstructured text data that identifies an intended entity, wherein the unstructured text data is input by the user;
- determine a context associated with the request using project state data that is specific to the user and a project for which the request for programming code is received;
- determine the intended entity from the unstructured text data and the determined context;
- identify, from a set of templates, a template associated with the intended entity, the template including a set of parameters;
- extract, from the unstructured text data, at least one value for at least one parameter in the set of parameters; and
- generate the programming code by populating each parameter in the set of parameters of the template with its determined value.

14. The non-transitory computer-readable medium of claim 13, wherein the instructions comprise further instructions that, when executed by the one or more processors, cause the one or more processors to determine a programming language associated with the request, wherein the template is further associated with the programming language.

15. The non-transitory computer-readable medium of claim 13, wherein the intended entity is identified from the unstructured text data using one or more natural language processing techniques.

16. The non-transitory computer-readable medium of claim 13, wherein the instructions to receive the request for programming code from the user comprise further instructions to cause the one or more processors to receive an audio request and convert the audio request into a text-based request, and wherein the audio request is converted into the text-based request using one or more speech to text techniques.

17. The method of claim 1, wherein the intended entity is a programming entity comprising at least one of a programming operation or a programming module.

18. The method of claim 1, wherein the template is associated with a specified order for the set of parameters, and the programming code comprises the set of parameters in the specified order with their respective determined values.

19. The method of claim 1, wherein the request is a first request, and the method further comprises:
- receiving a second request to define a variable associated with the at least one parameter; and
- updating the project state data to define the variable, and wherein generating the programming code comprises generating the programming code by at least accessing the defined variable from the project state data.

* * * * *